July 12, 1960 R. E. PARK 2,944,533
INTERNAL COMBUSTION ENGINE
Filed Sept. 22, 1954 4 Sheets-Sheet 1

Inventor
Robert E. Park
Carlson, Pitzner, Hubbard & Wolfe
Attorneys

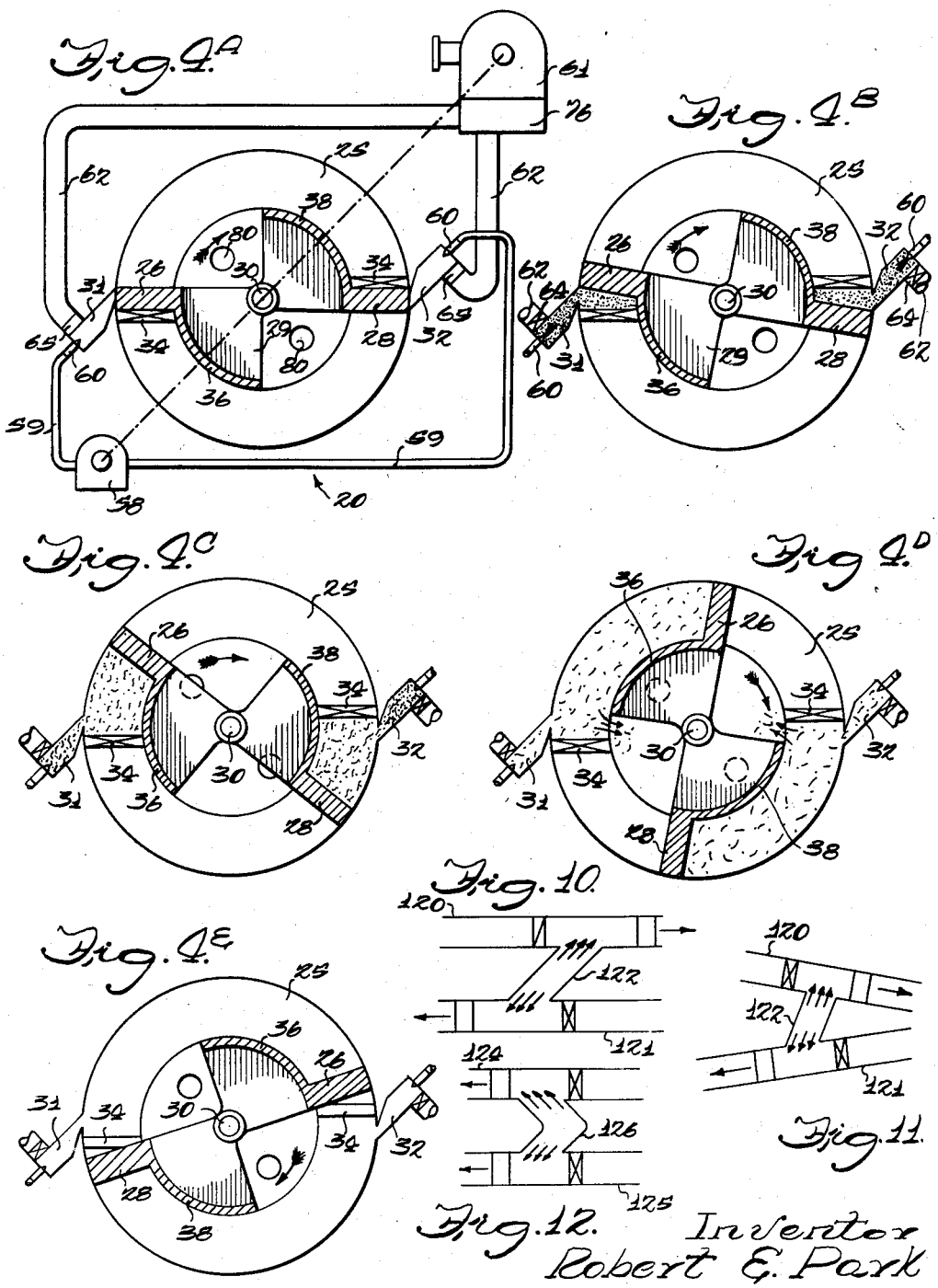

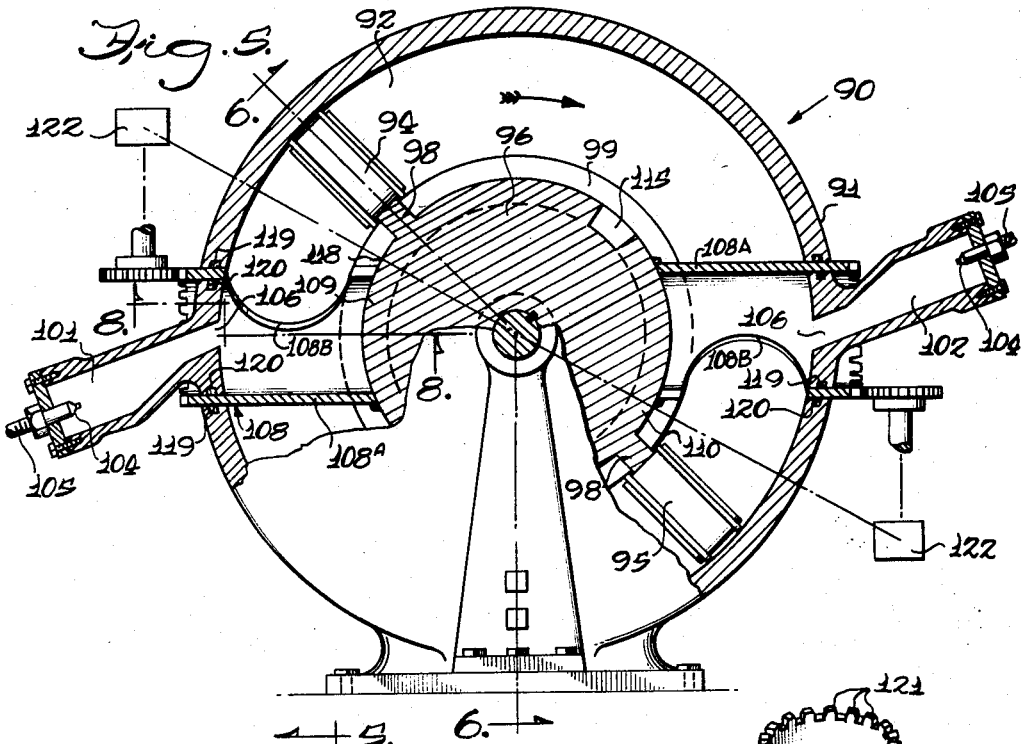
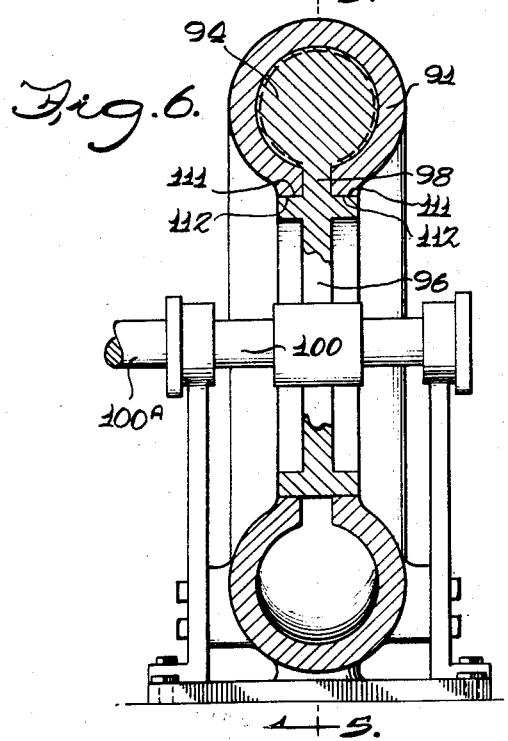
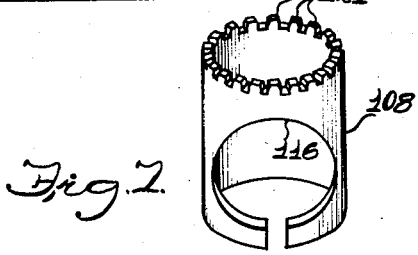
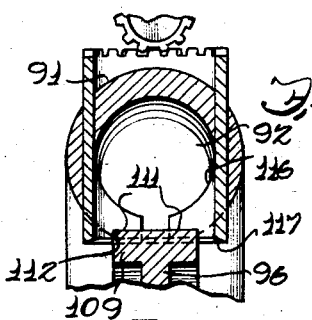

July 12, 1960  R. E. PARK  2,944,533
INTERNAL COMBUSTION ENGINE
Filed Sept. 22, 1954  4 Sheets-Sheet 4
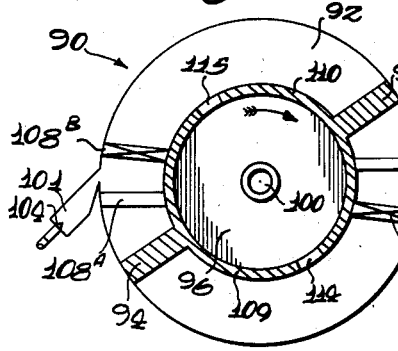
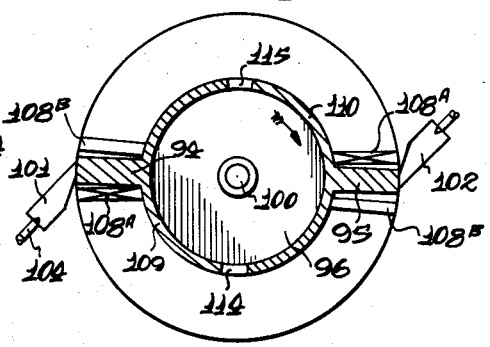
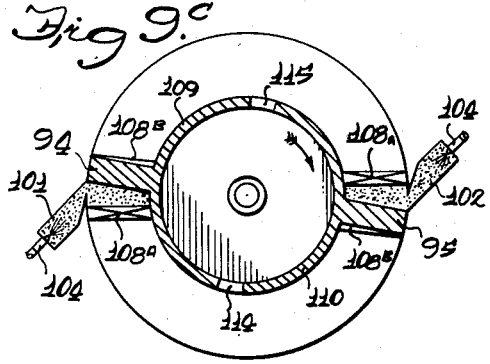
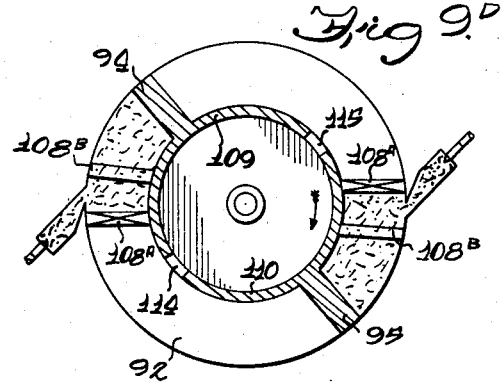
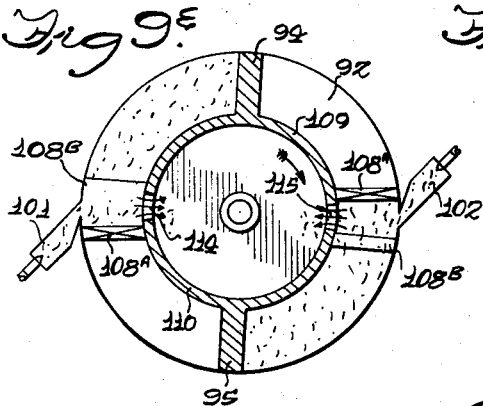
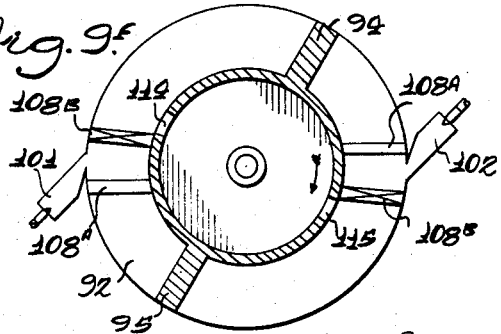
Inventor
Robert E. Park
Carlson, Pitzner, Hubbard & Wolfe
Attorneys

United States Patent Office 2,944,533
Patented July 12, 1960

2,944,533

INTERNAL COMBUSTION ENGINE

Robert Edward Park, 603 High St., Trenton, Tenn.

Filed Sept. 22, 1954, Ser. No. 457,720

4 Claims. (Cl. 123—13)

The present invention relates to internal combustion engines in general, and, more specifically to a novel engine particularly well adapted for diesel or semi-diesel operation.

One object of the invention is to provide an internal combustion engine wherein the power impulses will be applied to rotary rather than to reciprocating parts.

Another object is to provide an engine of the character set forth and which will produce a plurality of power impulses on each piston for each revolution of the output shaft.

A further object of the invention is to provide an engine of the foregoing type which will have a high operating efficiency, susceptible of operation at high compression, with an exceptionally long stroke, and including an exhaust gas heat exchanger for preheating the intake air of the engine.

Still another object is to provide an engine of the type set forth and which will be of simple, economical construction and yet well balanced, rugged, and characterized by a high power output per unit of weight.

A further object is to provide an engine of the character set forth and which will include basic units susceptible of versatile arrangement in banks to suit a wide range of specific installations.

Other objects and advantages will become apparent as the following description proceeds, taken together with the accompanying drawings, wherein.

Figure 1:
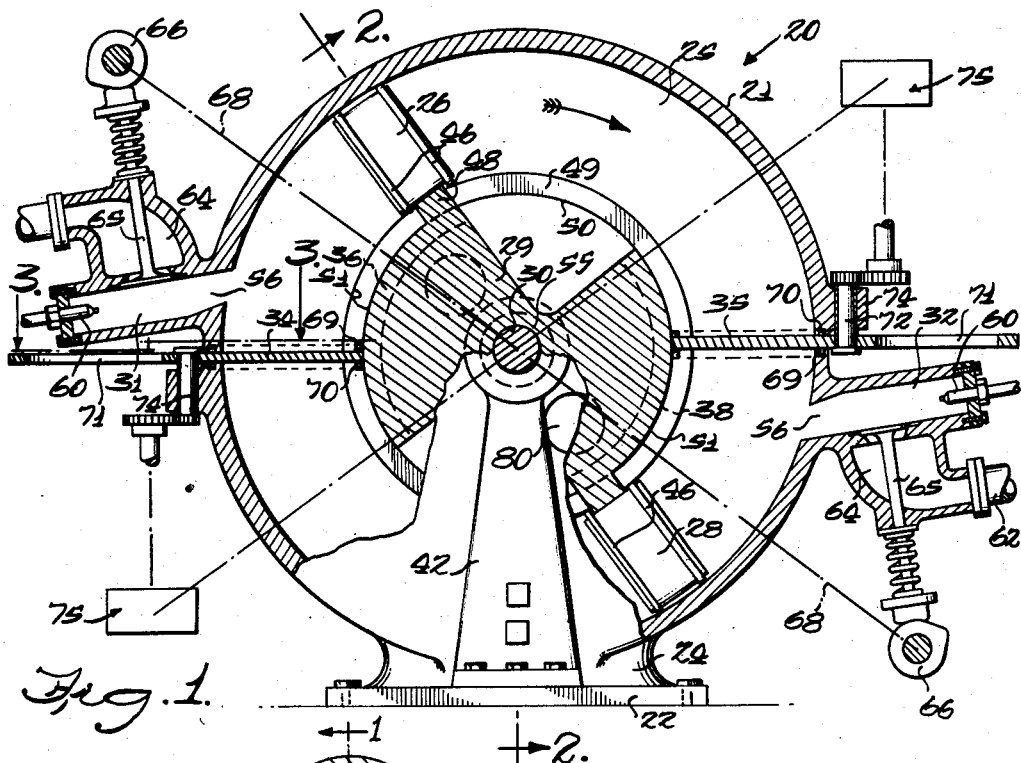
Figure 1 is an end elevation of an illustrative engine embodying one form of the invention, most of the working parts being illustrated in vertical section corresponding to the plane of the line 1—1 in Fig. 2.

Figs. 4A to 4E, inclusive, are schematic views of the illustrative engine of Fig. 1 and showing the same sequentially in various operative positions.

Fig. 5 is an end elevation of another illustrative engine embodying a modification of the invention, with most of the working parts being shown in vertical section corresponding to the plane of the line 5—5 in Fig. 6.

Fig. 6 is a transverse sectional view taken through the engine of Fig. 5 in the plane of the line 6—6.

Figs. 7 and 8 are perspective and vertical sectional views, respectively, detailing one of the valve elements of the engine shown in Fig. 5.

Figs. 9A to 9F, inclusive, are schematic views of the engine of Fig. 5 showing the same sequentially in various operative positions.

Figs. 10, 11 and 12 are fragmentary, schematic views illustrating certain variants in the arrangement of engine units embodying the present invention.

While the invention is susceptible of various modifications and alternative constructions, certain illustrative embodiments of the novel engine have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Figure 2:
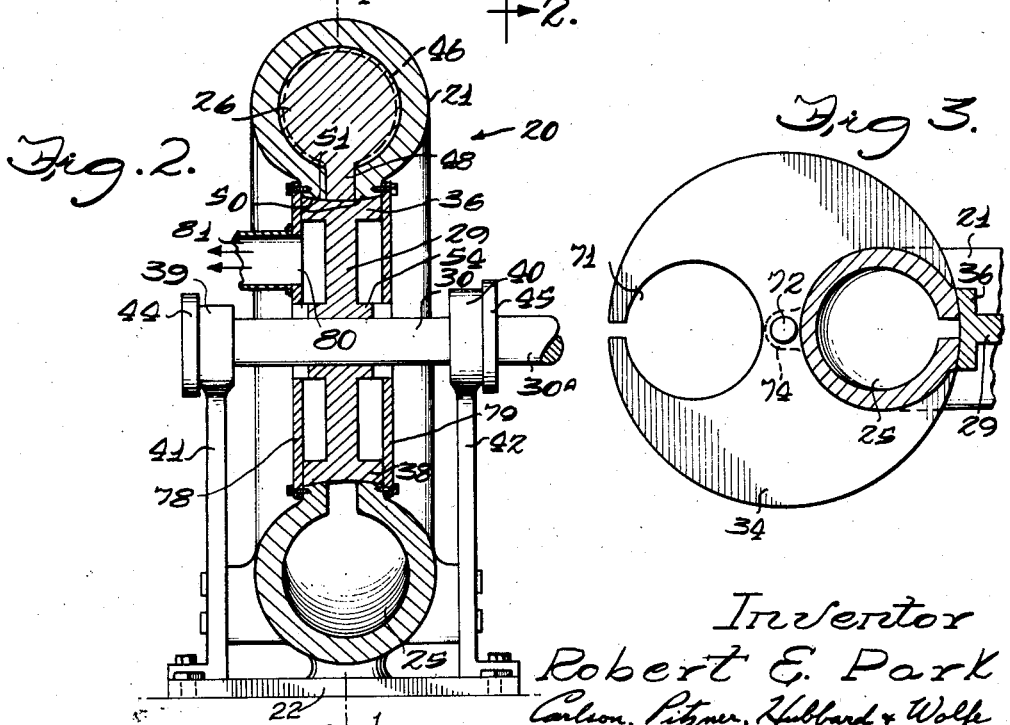
Fig. 2 is a transverse sectional view taken through the illustrative engine in the plane of the line 2—2 in Fig. 1.
Figure 3:
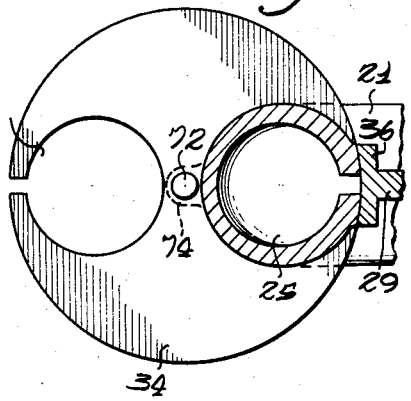
Fig. 3 is a fragmentary transverse sectional view taken in the plane of the line 3—3 in Fig. 1.

Referring more specifically to Figs. 1 to 3, inclusive, the invention is there exemplified in an illustrative engine 20. The latter comprises an annular or toroidal housing 21 rigidly supported on a base 22 as by means of a bracket 24. The housing 21 somewhat resembles an automobile tire casing and has defined in its interior a toroidal chamber which, simply for purposes of convenient description, will be referred to as a circular "cylinder" 25. In this instance, two diametrically opposed pistons 26, 28 are mounted for orbital movement in a clockwise direction along the cylinder 25. The pistons are rigidly connected with a rotor 29 fixed on a crankless shaft disposed coaxially of the cylinder 25 and which, for purposes of description, will be referred to as the output shaft 30. Power impulses are imparted to the pistons 26, 28, and ultimately to the output shaft 30, through the operation of circumferentially spaced combustion chambers 31, 32. These chambers produce expanding charges of fuel and air which act against the trailing faces of the pistons, the interior of the cylinder 25, reaction or gate valves 34, 35, and sliding piston seals 36, 38. The output shaft 30 is journaled in a pair of main bearings 39, 40 which are respectively mounted on upstanding support brackets 41, 42 fixed to the base 22. The shaft 30 may be constrained against excessive end play in the main bearings by the use of an expedient such as outboard thrust collars 44, 45. Power imparted to the shaft 30 by the pistons 26, 28 may conveniently be delivered to a driven element via an extension 30A of the shaft 30.

Turning to the piston assembly in greater detail, it will be noted that the pistons 26, 28 are supported and guided in their orbital movement by the output shaft 30 and intervening connections. Consequently, extended skirts are entirely unnecessary and the pistons may be relatively short in length and relatively light in weight. Each piston may be provided with an appropriate gas seal which, in the present case, comprises one or more piston rings 46 sealingly engaging the inner peripheral walls of the cylinder 25. Each piston is connected to the rotor 29 by means of a relatively short strut 48 which rides in an annular slot 49 situated in the wall of the housing 21. During the power stroke of each piston, this slot is sealed off by the strut 48 and by opposed sealing faces 50, 51 situated respectively on the housing 21 and on the sliding piston seals 36, 38.

The rotor 29 may be constructed in a variety of ways. In this instance, it happens to be fashioned in the form of an integral wheel having relatively large relief notches 52 which facilitate rapid removal of exhaust gases. The rotor also includes a hub 54 fixed to the output shaft 30 as by means of a key 55.

Each of the combustion chambers 31, 32 is adapted to receive a charge of compressed air and fuel, to permit combination of the same, and to discharge the resulting expanding gases into the sealed chamber behind each piston. In order to take advantage of any nozzle effect incident to such discharge, the chambers 31, 32 are disposed in trailing relation with respect to the direction of piston rotation so that the discharge will have a component running along the piston orbit and in the direction of piston movement. This may be accomplished by mounting the combustion chambers 31, 32 on the outer peripheral wall of the housing 21, as shown in Fig. 1, or by mounting the chambers on either side wall of housing 21 so as to project generally axially thereof. The directional and nozzle effect of the combustion chamber discharges may be further accentuated by means of a constriction defining a throat 56 at the mouth of each chamber.

Fuel is supplied to the combustion chambers 31, 32 by means of an injection system driven in timed relation to the pistons and output shaft. Such system in this case comprises an injector pump 58 for delivering pressurized liquid fuel via pressure conduits 59, and a pair of injectors 60 mounted respectively in the head of each combustion chamber (see Figs. 1 and 4A). The injectors happen to be of the solid injection type, as distinguished from the air injection type, and may be mounted in the combustion chamber heads in any suitable manner.

Compressed air at a pressure sufficient to initiate combustion of the injected fuel is furnished to each combustion chamber from a compressor 61 driven by the output shaft 30 (Fig. 4A). The compressor is connected to each combustion chamber by means of an air pipe 62 having a flanged connection with a valve chamber 64 integrally attached to the combustion chamber. A poppet valve 65 is interposed between each valve chamber and its associated combustion chamber to control air intake. Each valve 65 is biased into a normally closed position by a heavy loading spring and is actuated by means of a cam 66 driven in timed relation with the output shaft 30 by means of a linkage shown diagrammatically by the line 68.

The combustion chamber arrangement just described is well adapted for diesel operation, wherein combustion takes place at constant pressure, or for semi-diesel operation, wherein combustion begins at constant volume and terminates at constant pressure. Such arrangement can also be adapted for operation in a manner somewhat analogous to that of a Hesselman engine, wherein the fuel is ignited by a spark plug instead of by the heat of the compressed air charge. This may be accomplished by providing each combustion chamber with a spark plug and an ignition system. In such event, compressed air may be furnished to the combustion chambers at a much lower pressure than that required for diesel operation.

Turning now to the reaction or gate valve assemblies respectively associated with each combustion chamber, it will be noted that the valve element 34 of each such assembly is fashioned as a flat disk. The disk intersects the annular cylinder 25 transversely of the piston orbit and is sealed relative to the former by means of opposed sealing elements 69, 70 (Fig. 1). The outer periphery of the disk also makes sealing engagement with the face 51 on each of the sliding piston seals 36, 38. The disk 34 has a clearance aperture 71 through which the pistons 26, 28 and their rotor connecting struts 48 are adapted to pass when the aperture 71 is brought into registration with the cylinder 25.

Each of the valves 34 is fixed to a supporting shaft 72 journaled in a bearing housing 74 on the cylinder housing 21. Each valve is driven intermittently and in timed relation to the output shaft 30 by means of an actuating linkage and suitable gearing, all indicated diagrammatically by the numeral 75.

Provision is made for increasing the efficiency of the engine 20 by extracting waste heat from the exhaust gases and utilizing it to preheat the air input to the engine. This may be accomplished by utilizing a heat exchanger 76 (Fig. 4A) on the discharge side of the compressor 61. Exhaust gases are collected in the enclosure defined by the fixed panels 78, 79 which encase the rotor 29. Such gases are led to the heat exchanger 76 via apertures 80 in the plate 78 and ducts 81 (Figs. 1 and 4A), thereby increasing the temperature of the compressed air furnished to the combustion chambers via air pipes 62.

Cooling of the engine 20 may be effected in a variety of ways, utilizing either air or a liquid medium. In the present instance, it is contemplated that the engine be air cooled. Since the present invention is not concerned with the cooling system per se, the details of such system have been omitted.

While the operation of the engine 20 will no doubt be apparent to those skilled in the art, a brief synopsis of operation, based on Figs. 4A to 4E, is deemed appropriate at this point. Assume the engine to be in the condition shown in Fig. 4A with the pistons 26, 28 orbiting in a clockwise direction and having just passed through the reaction valves 34 which close rapidly behind them. In such position, the pistons block off the combustion chambers 31, 32, and air from the compressor 61 is introduced into these chambers via poppet valves 65 which are then open.

As pistons 26, 28 move clockwise a sufficient distance to commence opening the combustion chambers 31, 32 to the interior of the cylinder 25, fuel is injected into the combustion chambers 31, 32 by the injectors 60 and combustion promptly occurs. The valves 34 and 64 are closed, as indicated in Fig. 4B, and the sliding piston seals 36, 38 prevent escape of the burning gases from behind the pistons 26, 28. As the pistons 26, 28 reach approximately the position shown in Fig. 4C injection of fuel no longer occurs and the confined gases continue to expand, driving the pistons further in the clockwise direction. By the time the pistons 26, 28 have reached the position shown in Fig. 4D, the trailing ends of the sliding piston seals 36, 38 have passed the closed reaction valves 34, permitting the expanded gases to exhaust from the cylinder 25 via the annular slot 49 in the cylinder housing 21. It will be appreciated, incidentally, that the "power stroke" of each piston may be selectively determined by the arcuate length of the sliding piston seals 36, 38. While these have been shown with an angular length which approaches 90°, it is clear that they may be made substantially longer or shorter to suit specific design requirements. Turning finally to Fig. 4E, it will be noted that the flywheel effect of the pistons 26, 28 and their associated rotating parts has produced continued clockwise movement of the pistons, shifting the same from the position shown in Fig. 4D to that shown in Fig. 4E. At this point, the reaction valves 34 are open to permit passage of the pistons 26, 28 thereby. As soon as the rotor reaches a position corresponding to that indicated in Fig. 4A but actually 180° displaced therefrom, the valves 34 close and the power cycle is repeated through another 180°. It will be noted, that for each full revolution of the output shaft 30, each piston receives two power impulses, one resulting from the charge of combustion chamber 31 and the other resulting from the charge of combustion chamber 32.

Referring next to Figs. 5 to 9F, inclusive, there is shown another illustrative engine 90 which embodies a modification of the invention. The engine 90 bears considerable structural similarity to the engine 20 but differs primarily in that it does not require an external compressor. As in the case of the engine 20, the engine 90 is adapted for diesel or semi-diesel operation and when provided with an ignition system will operate after the manner of a Hesselman engine.

The engine 90 comprises an annular or toroidal housing 91 similar to the housing 21 and having an annular cylinder 92 defined therein. In this case, diametrically opposed pistons 94, 95 are mounted for orbital movement in a clockwise direction along the cylinder 92. The pistons 94, 95 are provided with rings or other appropriate seals with respect to the cylinder 92 and are rigidly connected to rotor 96 by struts 98. The latter ride in slot 99 situated in the inner peripheral wall of the housing 91. The rotor 96 is keyed or otherwise rigidly secured to an output shaft 100 mounted after the manner of the output shaft 30 of engine 20. The shaft 100 is adapted to deliver power to a given element via an axial extension 100A (Fig. 6).

Power impulses are imparted to the pistons 94, 95 through the operation of circumferentially spaced combustion chambers 101, 102. Each of these chambers is equipped with a fuel injector 104 which is connected to a fuel injection system driven in timed relation to the pistons 94 and output shaft 100. Since the injection system resembles that of the engine 20, only the injectors themselves and adjoining portions of their associated fuel pressure conduits 105 have been shown (Fig. 5). Expanding gases are discharged from the combustion chambers 101, 102 with a component extending in the direction of piston movement, the chambers being disposed in trailing relation with respect to the direction of piston rotation to achieve this result. The nozzle effect of such discharge may be accentuated by the use of a constriction or throat 106 at the mouth of each combustion chamber. The expanding gases from the chambers 101, 102 act against the rear faces of the pistons 94, 95, the interior of the cylinder 92, reaction or gate valve 108A, and sliding piston seals 109, 110 which close off the slot 99 in the cylinder housing. The seals 109, 110 have sealing faces 111 which oppose corresponding sealing faces 112 situated on the inner periphery of the annular housing 91.

Provision is made in the engine 90 for compressing the air required for charging the combustion chambers as an incident to the orbital movement of the pistons 94, 95 along the cylinder 92, eliminating necessity for an external compressor. This is accomplished in part by utilizing a second reaction or gate valve 108B with each combustion chamber, the valve 108B being disposed "downstream" from its associated combustion chamber, considered with respect to direction of piston movement, the valve 108A being disposed "upstream" from its combustion chamber. The foregoing objective is also accomplished in part by extending the sliding piston seals 109, 110 ahead of their respective pistons 94, 95, as well as behind them the seals being separated by a pair of ports 114, 115 cut into the outer periphery of the rotor 96.

Considering the reaction valves 108A, 108B in greater detail, it will be noted that in Figs. 5, 7 and 8, each pair of such valves is shown consolidated into a single element of hollow cylindrical form, such element being designated by the numeral 108. As indicated particularly in Figs. 7 and 8, the valve element 108 has a clearance aperture 116 cut into its side walls, such aperture being of appropriate size to permit passage theretherough, of either one of the pistons 94, 95 and its connecting strut 98 when the aperture 116 is disposed in registry with the cylinder 92. The lower end 117 of the valve element 108 is preferably chamfered to a curvature approximating that of the outer face 111 of each sliding piston seal 109, 110 and, when installed, makes sealed engagement therewith. Each element 108 is mounted in the housing 91 transversely of the cylinder 92 but remains rotatable about its own axis, being sealed relative to the walls of the cylinder 92 by means of sealing elements 118, 119, 120.

Each valve element is driven intermittently and in timed relation with the orbital movement of the pistons 94, 95 and output shaft 100. For this purpose, the upper end of each valve element may be fashioned with gear teeth 121 defining in effect a crown gear. An appropriate valve actuator, indicated diagrammatically by the numeral 122, is adapted to transmit power to the teeth 121 by means of suitable gearing and mechanical connections. The actuator 122 is adapted to quickly snap the valve element 108 through approximately 180° displacements so as to coordinate its motion with that of the other engine components.

To summarize the operation of the engine 90, reference should be made to the sequential, diagrammatic views designated Figs. 9A to 9F, inclusive. Starting with the engine in the condition shown in Fig. 9A, it will be noted that the pistons 94, 95, rotor 96, and output shaft 100 are moving in a clockwise direction. The reaction valves 108A associated with each of the combustion chambers 101, 102 are open, while the reaction valves 108B are closed. Air trapped in the cylinder 92 between the leading faces of the pistons, the closed valves 108B, and the sliding piston seals 109, 110 is compressed and ultimately squeezed into each combustion chamber. As the pistons reach the position indicated in Fig. 9B, the reaction valves 108A close and the valves 108B open, the pistons at this point blocking off both combustion chambers 101, 102. With further clockwise movement of the pistons 94, 95 (such as shown in Fig. 9C), fuel is injected into the highly compressed air charges in the combustion chambers 101, 102 and combustion commences. After some additional angular movement of the pistons 94, 95, fuel injection is terminated and the burning charges are permitted to expand further, driving the pistons before them. At the same time, scavaging of the cylinder 92 takes place as the leading faces of the pistons 94, 95 and the closed reaction valves 108A squeeze gaseous residues out through the ports 114, 115. As the pistons move from the position shown in Fig. 9D to that shown in 9E, the ports 114, 115 pass closed reaction valves 108A, thereby venting the expanded gases from behind the pistons 94, 95 to atmosphere or to an exhaust line via the ports 114, 115. As the pistons 94, 95 move from the position of Fig. 9E to that of Fig. 9F, the reaction valves 108A open and the valves 108B close. Since the ports 114, 115 have passed the closed valves 108B, air is again compressed ahead of the leading faces of the pistons 94, 95 and forced into the combustion chambers 101, 102. At the same time, the arcuate portions of the cylinder 92 between each closed valve 108B and each trailing face of the pistons 94, 95 are increasing in volume, drawing in air via the ports 114, 115. The sequence of actions just described then repeats itself for another 180°, the combustion chambers 101, 102 now respectively supplying charges which drive the pistons 95, 94 and ultimately returning the pistons and rotor to the position shown in Fig. 9A.

During the operation just described, it will be noted that reliance is placed upon the flywheel effect of the piston, rotor and output shaft assembly to store up sufficient energy for adequate compression. The mass of these parts may be increased or supplemented to whatever extent may be necessary to achieve proper compression for a given set of operating conditions. It should also be noted that the power and compression strokes of the pistons 94 and 95 may be selectively altered by shifting the angular location of the ports 114, 115 between the sliding seals 109, 110.

Cooling of the engine 90 may be accomplished in any appropriate manner. As in the case of the engine 20, the engine 90 happens to be air cooled but cooling system details have not been shown since the invention is not particularly concerned with them.

Internal combustion engines such as those described above are susceptible of arrangement in a wide variety of multiple units to provide increased power output or to meet specific installation requirements. For example, as shown diagrammatically in Fig. 10, a plurality of units 120, 121 such as the engine 20 or the engine 90 may be arranged in a bank or a stack with the pistons of each unit orbiting in a direction opposite from that of the other unit. This conveniently lends itself to the use of common combustion chambers 122 serving both units. As shown in Fig. 11, the units 120, 121 need not be parallel to each other but may be skewed at a considerable angle.

Multiple engine units 124, 125 of the foregoing type may also be arranged so that their respective pistons rotate in the same direction and drive a common output shaft. Common combustion chambers 126 may be used in such event and would preferably be somewhat U-shaped. The units 124, 125 may even be arranged to drive separate output shafts, or may be arranged in skewed relation, as specific installation requirements may dictate.

I claim as my invention:

1. An internal combustion engine comprising the combination of an output shaft, a housing defining an annular chamber concentric with said shaft, a plurality of pistons fixed to said shaft for orbital movement in a given direction in said annular chamber, each said piston being adapted to effect both compression and power development, a like plurality of combustion chambers communicating with said annular chamber, each said combustion chamber being disposed at an angle to said annular chamber and adapted to effect against one of said pistons simultaneously with the other said combustion chamber a discharge of expanding gases having a velocity component running in said given direction, and a constricted throat at the discharge end of each said combustion chamber.

2. An internal combustion engine comprising, in combination, a housing, means defining an annular piston chamber in said housing and an annular slot communicating between said chamber and the exterior of said housing, a plurality of combustion chambers each communicating with said piston chamber via a mouth, means for periodically injecting fuel into each said combustion chamber, a pair of gate valves disposed transversely of said annular piston chamber and situated in straddling relation with the mouth of each said combustion chamber, an output shaft disposed in concentric relation with said annular chamber, means for driving said gate valves in timed relation with said output shaft, a rotor fixed to said shaft, a plurality of pistons connected to said rotor via said annular slot, sliding piston seals each mounted on said rotor in leading and trailing relation to each of said pistons, said seals being adapted to close said annular slot over a progressively changing portion of its circumferential length, said leading and trailing seal of one of said pistons being separated from said leading and trailing seal of the other of said pistons by circumferential ports in said rotor between the ends of said sliding piston seals.

3. In an internal combustion engine, the combination comprising a housing having an annular piston chamber defined therein with an annular slot communicating between said chamber and the exterior of said housing, an output shaft disposed in concentric relation with the annular chamber, at least one piston connected to said output shaft and disposed for orbital movement in said annular chamber, said piston being adapted to effect both compression and power development, at least one combustion chamber on the housing communicating with said annular chamber via a mouth, the number of combustion chambers being equal to the number of pistons, and a pair of gate valves disposed on opposite sides of the mouth of said combustion chamber and transversely of said annular chamber for intermittently blocking off the latter, said gate valves also being constructed and arranged to clear said annular chamber and permit said piston to move past said valves, and a sliding piston seal fixed relative to said shaft in leading and trailing relation to said piston, means in the leading and trailing seal of said piston defining a port opening through said slot into said annular chamber so that said seals close said annular slot over a progressively changing portion of its circumferential length.

4. In an internal combustion engine, the combination comprising, a housing means defining an annular piston chamber in said housing and an annular slot communicating between said chamber and the exterior of said housing, an output shaft disposed in concentric relation with said annular chamber, a pair of pistons disposed in diametrically opposed relation for orbital movement in said annular chamber, means connecting said pistons to said shaft, said pistons being adapted to effect both compression and power development, a pair of diametrically opposed combustion chambers communicating with said annular chamber via a mouth, a hollow cylindrical gate valve means disposed transversely of said annular piston chamber and situated in straddling relation with the mouth of each of said combustion chambers, means for driving said valve means in timed relation with said shaft to clear said annular chamber on one side of said combustion chambers while closing said annular chamber on the opposite side of said combustion chambers and to subsequently reverse the position of said valve means to permit said pistons to move past said combustion chambers and valve means, and sliding piston seals mounted in leading and trailing relation on each of said piston connecting means for closing said annular slot over a progressively changing portion of its circumferential length, the leading and trailing seal of one of said pistons being separated from said leading and trailing seal of the other of said pistons by means defining ports in the ends of said seals opening through said slot into said annular chamber.

References Cited in the file of this patent

UNITED STATES PATENTS

| | | |
|---|---|---|
| 649,122 | Allen | May 8, 1900 |
| 1,106,666 | Miller | Aug. 11, 1914 |
| 1,305,155 | O'Haver | May 27, 1919 |
| 1,311,858 | Fischer | July 29, 1919 |
| 1,562,299 | Cundy | Nov. 17, 1925 |
| 1,704,254 | Jaffe | Mar. 5, 1929 |
| 1,713,378 | Engman | May 14, 1929 |
| 1,720,098 | Shreffler et al. | July 9, 1929 |
| 1,773,635 | Simmons | Aug. 19, 1930 |
| 2,273,625 | Concannon | Feb. 17, 1942 |
| 2,719,513 | Dezell | Oct. 4, 1955 |